(No Model.)
J. B. VIENNEY.
MIRROR.
No. 381,600. Patented Apr. 24, 1888.
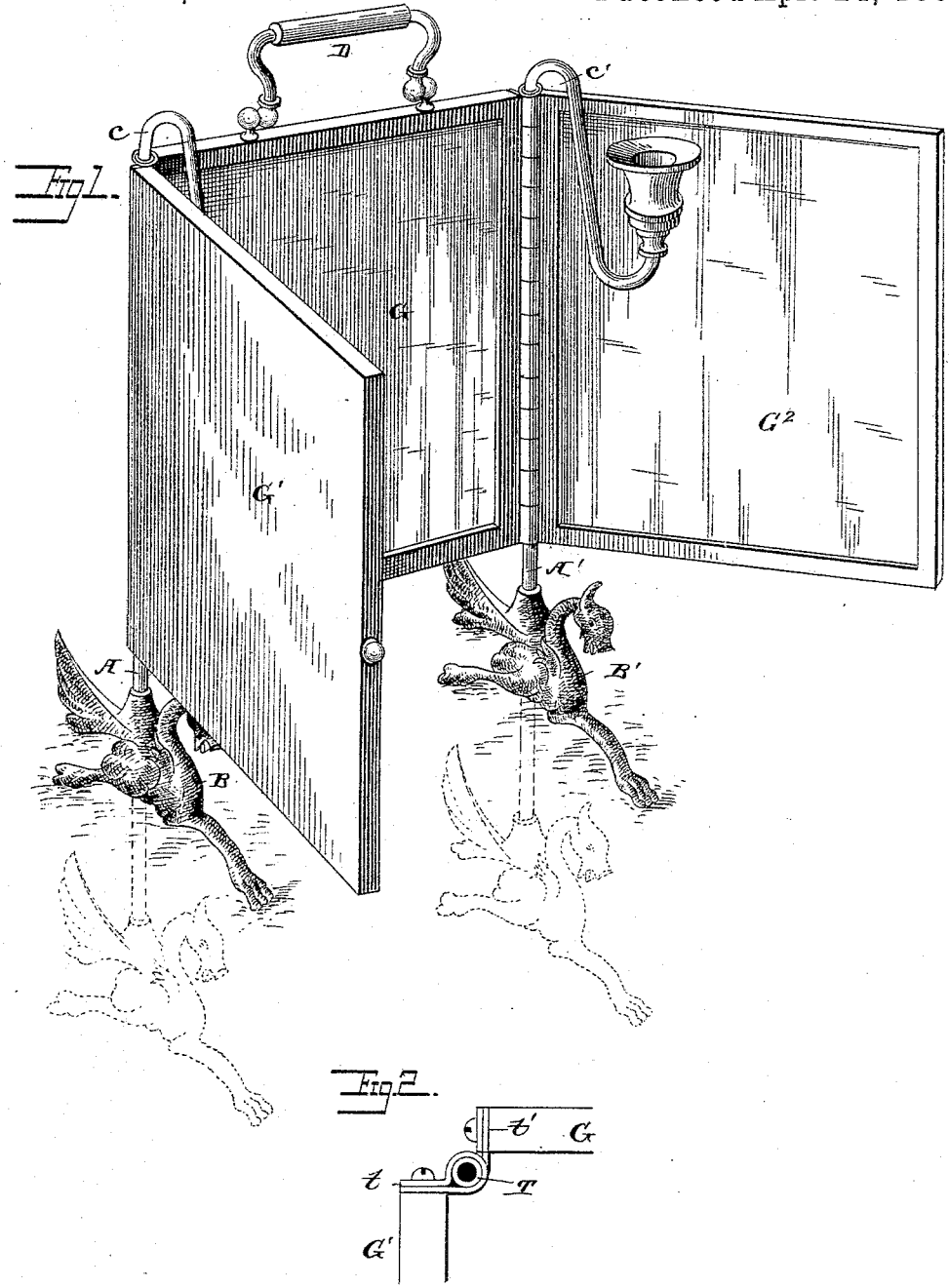
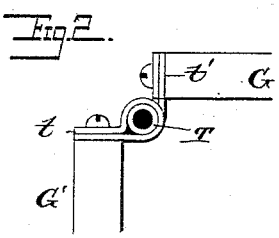
Witnesses
Jno. G. Hinkel Jr.
Charles W. Morris, Jr.
Jean Baptiste Vienney,
Inventor.
by Foster & Freeman
Attorneys.

UNITED STATES PATENT OFFICE.

JEAN BAPTISTE VIENNEY, OF PARIS, FRANCE.

MIRROR.

SPECIFICATION forming part of Letters Patent No. 381,600, dated April 24, 1888.

Application filed November 10, 1887. Serial No. 254,780. (No model.) Patented in France April 12, 1886, No. 173,308.

*To all whom it may concern:*

Be it known that I, JEAN BAPTISTE VIENNEY, a citizen of the Republic of France, residing at Paris, in said Republic, have invented certain new and useful improvements in that class of mirrors with three glasses jointed together which are made use of for the toilet, (for which I have received Letters Patent in France dated April 12, 1886, No. 173,308;) and I do hereby declare that the following is a full, clear, and exact description of the invention, which will enable others skilled in the art to which it appertains to make and use the same.

The general purpose of the invention is to render that class of mirrors more portable and convenient either by allowing the height of the mirrors, when standing on another piece of furniture, to be varied or by suspending them against a wall, or in any other manner, with the greatest ease.

The following description, together with the drawings which accompany this specification, will enable the nature of my improvements to be easily understood.

Figure 1 is a perspective view of a mirror with three glasses made after my improved method. Fig. 2 is a geometrical plan of one of the hinges.

The principle of my improvements is embodied in the disposition of the hinges about which turn the frames holding the two side glasses.

Instead of passing a full-length pin through the eye of the hinge-sections, as is done in ordinary hinges, I make use of a tube, T, Fig. 2, in which are articulated the two parts $t$ and $t'$ of the hinge. In this way the middle space of the articulation is left free, and I can insert there the two rods A A', which support the ornamental plates. The rods A A' are set to slide closely within the tubes T of the hinges, in order that the mirror may be easily raised or lowered, (see the dotted lines,) and thus insure the convenient use of it, at the same time that the necessary stability is also obtained. In the upper part I place two candlesticks, the stems of which, $c\ c'$, move freely in the tubes T of the hinges. These candlesticks are very easily taken out when the movable glasses G' G² of the mirror are folded over each other. Finally, I place in the top of the fixed mirror G, in the middle, a hinged handle, D, to enable the mirror to be carried about, as well, also, as to permit it to be hung up against the wall or otherwise. In the latter case I give a quarter-turn to the plates G' and G², so that they may range parallel with the wall and permit the mirror to hang in a vertical position.

My several improvements admit readily of all sorts of ornamentation, and it will be readily perceived that when thus applied to mirrors of three glasses they make the use of this article of the toilet more convenient and more practical, at the same time giving it an artistic appearance which it has not hitherto possessed.

Having thus fully described my invention, what I desire to claim and to secure by Letters Patent is—

1. In a three-part mirror, the combination, with the frames provided with hinge-sections, of the rods passing through the sections and supporting the mirror, the mirror being vertically adjustable upon said rods, substantially as described.

2. In a three-part mirror, the combination, with the frames provided with hinge sections, of tubes embraced by the hinge sections and connecting the latter and rods passing through said tubes and vertically adjustable therein, substantially as described.

JEAN BAPTISTE VIENNEY.

Witnesses:
  JOS. B. BOURNE,
  GEORGE WALKER.